Patented Apr. 14, 1953

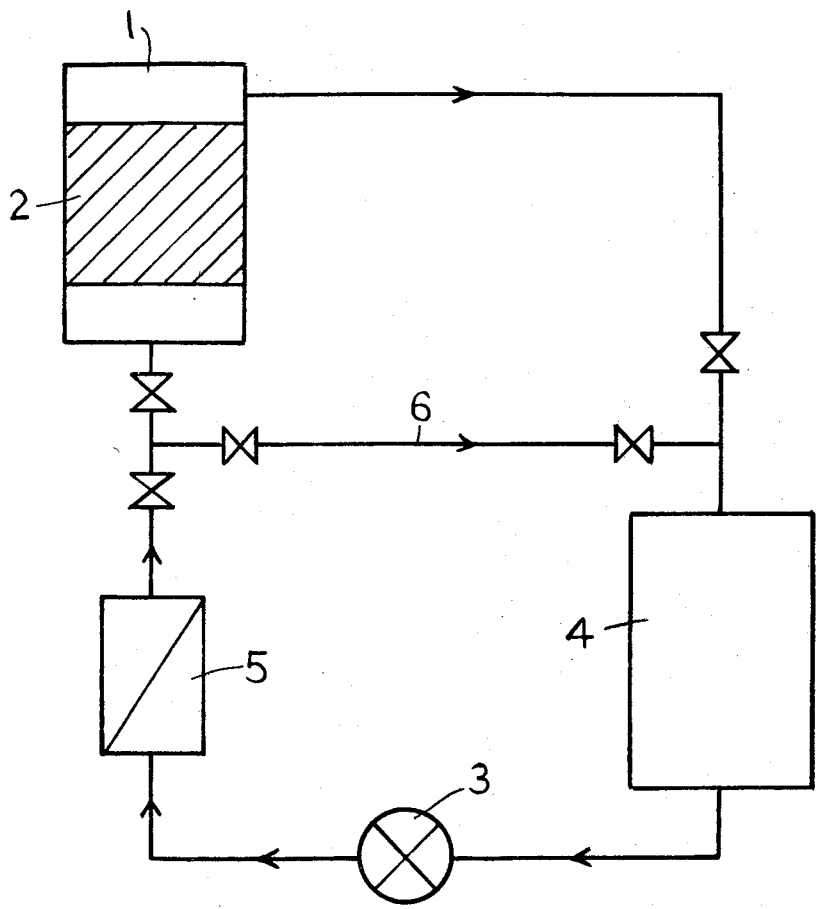

2,635,098

UNITED STATES PATENT OFFICE 2,635,098

PRODUCTION OF CELLULOSE TRIESTERS

Godfrey J. Cave, Shilton, near Coventry, and Henry Hampson and John P. Stoneman, Coventry, England, assignors to Courtaulds Limited, London, England, a British company Application December 3, 1951, Serial No. 259,662
In Great Britain January 4, 1951

2 Claims. (Cl. 260—229)

This invention relates to the production of cellulose triesters.

It is known (see for example United States patent specification No. 1,861,320) that cellulose in fibrous form may be esterified whilst maintaining its fibrous structure by treating the fibres with an esterifying solution comprising a fatty acid anhydride, an esterification catalyst and an inert solvent or solvent mixture, that is to say a solvent or solvent mixture which is miscible with the anhydride and the catalyst but which will not dissolve cellulose or the cellulose triester.

It has also been proposed, for example in French patent specification No. 929,968, to produce cellulose esters in fibrous form by treating a stationary cellulose mass with an esterifying liquid which is passed through the mass of cellulose, usually after pretreatment of the cellulose with a fatty acid. When carrying out such a process by passing an esterifying solution through a static bed of cellulose, there is an immediate reaction in which a large quantity of heat is evolved. This heat is believed to arise from an initial reaction between the acid anhydride and the water present as moisture in the cellulose. For the production of high grade cellulose triacetate it is desirable that this initial heat of reaction should be removed before the acetylation reaction begins as otherwise the temperature is more difficult to control and a poor product of variable viscosity and homogeneity is obtained. When carrying out small scale esterifications it may be possible to control this initial heat by suitable heat-exchangers but such control methods on their own are unsuitable for operations on a commercial scale. It has been proposed in United States patent specification No. 2,033,716 to prepare uniform cellulose esters in fibrous form using comparatively large amounts of reagents but this method of controlling the initial heat of reaction is in general uneconomical.

The object of the present invention is economically to control the initial heat of reaction.

According to the present invention a process for the production of cellulose triesters comprises forming a static bed of cellulose pretreated with the appropriate fatty acid, continuously passing a liquid which comprises a fatty acid anhydride and an inert solvent or solvent mixture and which is either free from an esterification catalyst or contains part only of the quantity required for esterification, through the bed of cellulosic material under such conditions that the fibrous form of the cellulose is maintained, subsequently adding to the circulating liquid all or the remaining quantity of the catalyst and passing the esterification liquid so formed through the bed of cellulosic material until the cellulose has been converted substantially into a cellulose triester.

In one form of the invention, the initial circulating liquid contains no catalyst so that the liquid, containing only the acid anhydride and the non-solvent, removes all or most of the water present as moisture in the cellulose and the catalyst is then introduced into the circulating liquid at a point removed from the cellulose and the liquid formed is then circulated through a circuit which contains a heat-exchanger but does not include the reactor, so that the strongly exothermic reaction between the water and the anhydride takes place in the absence of the cellulose; when this reaction has finished, the liquid is then circulated through the reactor to effect esterification.

In one form, therefore, the process according to the present invention comprises forming a static bed of cellulose pretreated with the appropriate fatty acid, circulating a liquid consisting of a fatty acid anhydride and an inert solvent or solvent mixture through the bed of cellulose, adding an esterification catalyst to the circulating liquid at a point removed from the bed of cellulosic material so that reaction is initiated between water removed from the cellulose and the anhydride, removing the resultant heat of reaction from the circulating liquid while the liquid is maintained out of contact with the cellulosic material and then passing the resultant esterification liquid through the bed of cellulosic material until the cellulose has been converted substantially into a cellulose triester.

In a further form of the invention the initial circulating liquid contains a part, for example 10 to 30 per cent, preferably from 20 to 25 per cent, of the catalyst and this liquid is circulated until the initial water-anhydride reaction is completed. The remainder of the catalyst is then added for example to the acetylation vessel while the liquid is still being circulated. In a further alternative form, the circulation is started with a liquid containing the acid anhydride, non-solvent and no catalyst and the catalyst is slowly added to the liquid while it is being circulated. The catalyst may conveniently be added over a period of 15 to 30 minutes.

In the early stages of the esterification, the solid cellulosic phase swells with the result that the bed of cellulosic material tends to offer an additional resistance to the flow of liquid. The resultant resistance of the bed to the flow of liquid may be controlled by reversal of the flow as described in the specification of our application, Serial No. 220,592.

In carrying out the present invention the static bed of cellulosic material is preferably arranged in a reaction vessel which is connected to a reservoir for the circulating liquid, a heat exchanger, a pump and, if desired, a reversing manifold, which forms a closed liquid circulating system and a by-pass so arranged that the reaction vessel can be cut out and liquid passed from the heat exchanger through the by-pass to the reservoir, then to the pump and back to the heat exchanger.

The pretreatment of the cellulose with the appropriate fatty acid may be effected before the material is placed in the reaction vessel; alternatively the bed may be first formed with untreated cellulose and the pretreatment effected by circulating the acid through the bed.

Suitable catalysts for use in the invention are sulphuric acid, perchloric acid and mixtures of these two acids.

The invention is particularly applicable to the production of cellulose triacetate using acetic acid as the pretreating acid and acetic anhydride as the esterifying anhydride. Carbon tetrachloride, benzene or toluene are suitable inert solvents for use in acetylation.

The cellulose employed in the present invention is preferably in the form of wood pulp chips as described in the specification of copending application, Serial No. 259,705 of even date, but other forms of cellulose such as cotton linters or wood pulp may be used.

The present invention is illustrated by the following examples in which a circulating system as diagrammatically illustrated in the accompanying drawing was used; parts and percentages are by weight.

*Example 1*

1 part of purified wood pulp chips, measuring approximately 1 inch by ½ inch, as described in the specification of application, Serial No. 259,705 of even date, containing approximately 7 per cent of moisture was soaked for 8 hours in about 7 parts of glacial acetic acid at 35° centigrade. The pulp was then removed from the acetic acid and allowed to drain for ½ hour, the pulp retaining about twice its own weight of acetic acid. The pretreated pulp was then transferred to a reactor 1 to form a bed 2 of cellulose. A liquid consisting of 4.5 parts of acetic anhydride (95 per cent) and 14 parts of carbon tetrachloride initially at 15° centigrade was cirlated by a pump 3 from a storage tank 4 through a heat exchanger 5 into the reactor 1, through the bed 2 back into the storage tank 4. The time for each cycle was about 4 minutes. In acetylation catalyst consisting of 0.0125 part of 60 per cent perchloric acid was added uniformly to the circulating liquid by way of the storage tank 4 over the first 15 minutes of the acetylation period. By means of the heat exchanger 5 the temperature of the reaction was controlled so that after 43 minutes the temperature had risen from 15° centigrade to a peak temperature of 35° centigrade; thereafter heat was supplied to the liquid through the heat exchanger so as to maintain the temperature at 35° centigrade. After 5 hours the acetylation was stopped by adding sufficient sodium acetate to neutralise the perchloric acid. The acetylation liquors were then drained from the reactor through a by-pass draining line 6 into the tank 4. The fibrous product was then steamed and washed while it was still in the reactor 1 and was finally dried.

The product obtained was a fibrous cellulose acetate having an acetyl value of 62.1 per cent calculated as acetic acid, and a cuprammonium fluidity of 18 to 22. The cuprammonium fluidity was measured using a 1 percent solution of the cellulose in cuprammonium; the test is described and discussed in the report entitled "The Viscosity of Cellulose Solutions" issued by the Department of Scientific and Industrial Research in Great Britain in 1932.

*Example 2*

The procedure described in Example 1 was repeated with the following modification:

The liquor first circulated through the bed of pretreated cellulose contained 4.5 parts of acetic anhydride (95 percent), 14 parts of carbon tetrachloride and 0.003 part of 60 per cent perchloric acid and this liquor was circulated through the bed for 15 minutes. Thereupon a further 0.0095 part of perchloric acid was added uniformly over a period of 5 minutes to the circulating liquid.

The product obtained was similar to that of Example 1.

*Example 3*

A bed of about 3 parts of acetic acid pretreated cellulose obtained from 1 part of cellulose was formed in the reactor 1 as described in Example 1. A liquid containing 4.5 parts of acetic anhydride (95 per cent) and 14 parts of carbon tetrachloride was then circulated through the bed, the cycle time being about 4 minutes as in Example 1. After 10 minutes the circulation was stopped and 0.0125 part of 60 per cent perchloric acid was added to the liquid in the storage tank 4 and the liquor was then circulated through the heat exchanger, the by-pass and draining tube 6 and the tank 4 until the temperature of the liquor had been brought down to 16° centigrade. The initial 10 minutes circulation served to remove most of the water present as moisture in the cellulose and the subsequent circulation cutting out the reactor causes the water so removed to react with the anhydride in the absence of the cellulose. When the temperature of the liquid had reached 16° centigrade the liquor was circulated for a further 5 hours through the reactor as described in Example 1 to effect acetylation, the product being subsequently treated as described in Example 1.

The product obtained was similar to that of Example 1.

What we claim is:

1. A process for the production of cellulose triesters comprising forming a static bed of cellulose pretreated with the appropriate fatty acid, circulating a liquid consisting of a fatty acid anhydride and at least one inert solvent through the bed of cellulose, adding an esterification catalyst to the circulating liquid at a point removed from the bed of cellulosic material so that reaction is initiated between water removed from the cellulose and the anhydride, removing the resultant heat of reaction from the circulating liquid while the liquid is maintained out of contact with the cellulosic material and then passing the resultant esterification liquid through the bed of cellulosic material until the cellulose has been converted substantially into a cellulose triester.

2. A process for the production of cellulose triacetate comprising forming a static bed of cellulose pretreated with acetic acid, circulating a liquid consisting of acetic anhydride and at least one inert solvent through the bed of cellulose, adding an esterification catalyst to the circulating liquid at a point removed from the bed of cellulosic material so that reaction is initiated between water removed from the cellulose and the acetic anhydride, removing the resultant heat of reaction from the circulating liquid while the liquid is maintained out of contact with the cellulosic material and then passing the resultant acetylation liquid through the bed of cellulosic material until the cellulose has been converted substantially into cellulose triacetate.

G. J. CAVE.
H. HAMPSON.
J. P. STONEMAN.

References Cited in the file of this patent

UNITED STATES PATENTS

| Number | Name | Date |
| --- | --- | --- |
| 2,039,290 | Berl | May 5, 1936 |
| 2,176,088 | Walm | Oct. 17, 1939 |
| 2,206,288 | Malm | July 2, 1940 |
| 2,526,761 | Milbrada | Oct. 24, 1950 |